2,980,646
STABILIZED POLYETHYLENE

Gerald R. Lappin, Kingsport, Tenn., assignor to Eastman Kodak Company, Rochester, N.Y., a corporation of New Jersey No Drawing. Filed Dec. 16, 1957, Ser. No. 702,807

6 Claims. (Cl. 260—45.85)

This invention relates to a new group of compounds that have particularly utility for stabilizing organic plastic materials normally subject to photodegradation. A preferred embodiment of the invention concerns stabilized poly-α-olefin compositions, and more particularly, stabilized polyethylene compositions.

Many common organic plastic materials of commerce are subject to photodegradation. Photodegradation of organic plastic materials is evidenced by telltale properties which are imparted to the particular plastic material such as change or acquisition of odor or color, surface cracking, brittleness, loss of dielectric properties, and related properties deleterious of the utility of the organic plastic material. Accordingly, it is common practice to incorporate into organic plastic materials subject to photodegradation various materials to retard or inhibit the formation of such undesirable properties.

It is an object of this invention to provide a new group of compounds suitable for stabilizing organic plastic materials normally subject to photodegradation.

It is another object of this invention to provide a new poly-α-olefin composition of improved stability to ultraviolet light.

It is a further object of this invention to provide a novel deactivator of ultraviolet light that is compatible with normally solid polyethylene compositions.

Other objects of the invention will be apparent from the description and claims which follow.

The novel compounds of the present invention are higher alkyl esters of 3-hydroxy-4-(phenylcarbonyl)phenoxyacetic acid which have the following structural formula:

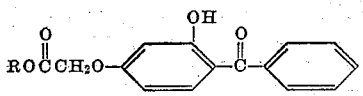

wherein R is an alkyl group containing from 6 to 18 carbon atoms. The substituent, R, can be either straight or branched chain alkyl groups including such groups as n-hexyl, n-heptyl, 2-ethylhexyl, n-octyl, 2-methyloctyl, n-nonyl, 2-propyloctyl, n-decyl, n-dodecyl, n-undecyl, n-dodecyl, n-tetradecyl, n-hexadecyl, n-octadecyl, oleyl, and the like, as well as various branched chain groups containing 6 to 18 carbon atoms derived from alcohols prepared by the oxo reaction.

The present higher alkyl esters of 3-hydroxy-4-(phenylcarbonyl)phenoxyacetic acid can be prepared by esterifying chloroacetic acid with a suitable alcohol having a higher alkyl moiety as described in the preceding paragraph, and thereafter reacting the resulting higher alkyl ester of chloroacetic acid with 2,4-dihydroxybenzophennone. The chloroacetic acid is initially reacted with the higher alkyl alcohol in a water-entraining solvent such as benzene, toluene, xylene, high-boiling naphtha, or the like, and water formed during the course of the reaction is continuously removed with a portion of the solvent.

The reaction of the higher alkyl ester of chloroacetic acid with 2,4-dihydroxybenzophenone is effected in the presence of a basic material such as potassium carbonate or sodium carbonate to take-up or neutralize the hydrogen chloride formed in the course of this reaction. The crude reaction product of the higher ester of 3-hydroxy-4-(phenylcarbonyl)phenoxyacetic acid can be "worked-up" or purified by recrystallization from a solvent much as methanol if solid, or, by distillation at reduced pressure if liquid, in accordance with usual chemical purification practice.

The present higher alkyl esters of 3-hydroxy-4-(phenylcarbonyl)phenoxyacetic acid have utility as stabilizers for organic plastic materials normally subject to photodegradation such as results on exposure to sunlight or ultraviolet light. Typical of the organic plastic materials that can be stabilized with higher alkyl esters of 3-hydroxy-4-(phenylcarbonyl)phenoxyacetic acid include polyvinyl chloride, polystyrene, cellulose acetate, cellulose acetate-butyrate, poly-1,4-cyclohexanedimethyleneterephthalate, polymethyl methacrylate, poly-α-olefins and related organic plastic materials normally subject to photodegradation. The present stabilizers have particular utility as ultraviolet stabilizers for normally solid poly-α-olefins such as polyethylene, polypropylene, poly-4-methylpentene-1, poly-3-methylbutene-1 and other normally solid poly-α-olefins prepared from normally gaseous α-monoolefinic hydrocarbons containing 2 to 10 carbon atoms.

The subject stabilizers are of special interest for the stabilization of normally solid polyethylene compositions against photodegradation as these stabilizers have unexpectedly good compatibility in polyethylene. Many stabilizer materials that are effective stabilizers for other well-known polymers, resins and polyesters are ineffective in polyethylene. For example, 2,4-dihydroxybenzophenone, an effective stabilizer for a wide variety of polymers, resins and polyesters, and from which the stabilizers described herein are prepared, is not an effective stabilizer in polyethylene as it is incompatible therewith. If 2,4-dihydroxybenzophenone is compounded in polyethylene at even a 0.5% by weight level, for example, exudation of 2,4-dihydroxybenzophenone begins at once, the surface of the polyethylene being covered with a film of crystals of the additive in a very short while. After a few weeks, essentially all of the 2,4-dihydroxybenzophenone additive exudes from the polyethylene and the resulting polyethylene has nearly the same degree of instability to photodegradation as unstabilized polyethylene. Thus, it was unexpected when I discovered that the present derivatives of 2,4-dihydroxybenzophenone were compatible with, and effective ultraviolet stabilizers for, polyethylene.

The present higher alkyl esters of 3-hydroxy-4-(phenylcarbonyl)phenoxyacetic acid can be employed in a wide range of proportions to stabilize organic plastic materials against photodegradation, the optimum amount used varying with the organic plastic material being stabilized. Amounts of the present stabilizer in excess of 0.01% by weight are usually used in most organic plastic materials, with about 0.1% to 10% by weight being desirably used in poly-α-olefins, and with amounts from about 0.5% to 2.5% by weight being preferably used in polyethylene.

The present stabilizers can be incorporated into organic plastic materials by conventional methods, the method used varying largely with the nature of the organic plastic material being stabilized. The stabilizer can be incorporated into the various substrates by dry blending, deposition from solvents and by milling on heated rolls and related conventional methods commonly employed for blending or incorporating stabilizers into organic plastic materials.

The invention is illustrated by the following examples of preferred embodiments thereof.

EXAMPLE 1

Several representative higher alkyl esters of 3-hydroxy-4-(phenylcarbonyl)phenoxyacetic acid were prepared by a process that can be represented by the following equations:

(1)
$$ClCH_2\overset{O}{\underset{\|}{C}}OH + ROH \longrightarrow ClCH_2\overset{O}{\underset{\|}{C}}OR + H_2O$$

(2)

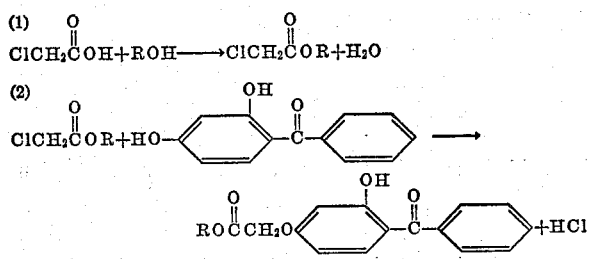

The following higher alkyl alcohols, represented by "ROH" in Equation 1 above, were used to prepare the present stabilizers: n-hexanol, n-octanol, 2-ethylhexanol, n-decanol, n-docecanol, n-tetradecanol, n-hexadecanol, n-octadecanol and oleyl alcohol. In the preparation of the higher alkyl ester of chloroacetic acid, 1.0 mole of chloroacetic acid and 1.0 mole of the higher alcohol were heated at reflux temperature in sufficient benzene so as to allow the continuous removal of water formed during the course of the reaction, which water was removed by means of a Dean-Stark trap fitted to the reactor. When 1.0 mole of water had evolved, the benzene was stripped off by vacuum distillation. A mixture of 1.0 mole of the resulting higher alkyl ester of chloroacetic acid, 1.0 mole of 2,4-dihydroxybenzophenone, 0.6 mole of potassium carbonate and 1 liter of acetone was heated at reflux temperature with stirring for 12 hours. The resulting reaction mixture was poured into water, and the crude reaction product separated therefrom. The crude product was purified by recrystallization from methanol if a solid, or, by vacuum distillation if a liquid. Although 2,4-dihydroxybenzophenone contains two phenolic hydroxyl groups, only one, the hydroxyl group in the 4-position, reacts with the higher alkyl ester of chloroacetic acid to form the present higher alkyl esters of 3-hydroxy-4-(phenylcarbonyl)phenoxyacetic acid by the present process. The melting points and carbon-hydrogen analyses of the resulting higher alkyl esters of 3-hydroxy-4-(phenylcarbonyl)phenoxyacetic acid are set-out in the following table. The "R" in the following table is the higher alkyl moiety comprising the higher alkyl alcohol used to prepare the present esters.

Table

| R | M.P., °C. | Anal. Calc'd Percent C | Anal. Calc'd Percent H | Anal. Found Percent C | Anal. Found Percent H |
|---|---|---|---|---|---|
| (1) n-hexyl | 60–61 | 70.8 | 6.74 | 70.6 | 6.62 |
| (2) n-octyl | 57–58 | 71.8 | 7.30 | 71.7 | 7.36 |
| (3) 2-ethylhexyl | ¹ oil | 71.8 | 7.30 | 72.0 | 7.10 |
| (4) n-decyl | 63–64 | 72.8 | 7.78 | 73.1 | 7.83 |
| (5) n-dodecyl | 66–68 | 73.6 | 8.20 | 73.4 | 8.12 |
| (6) n-tetradecyl | 69–71 | 74.3 | 8.55 | 74.1 | 8.36 |
| (7) n-hexadecyl | 74–76 | 75.0 | 8.87 | 74.9 | 9.01 |
| (8) n-octadecyl | 81–83 | 75.6 | 9.15 | 75.3 | 9.07 |
| (9) oleyl | oil | 75.8 | 8.80 | 75.4 | 8.93 |

¹ B.P. 240–250° C. at 0.5 mm. mercury.

EXAMPLE 2

The nine higher alkyl esters of 3-hydroxy-4-(phenylcarbonyl)phenoxyacetic acid described in the table above were individually incorporated into polyethylene having a molecular weight of about 30,000 at a concentration of 1% by weight by milling on heated rollers in accordance with usual practice. Thereafter, the polyethylene was compression molded into sheets 60 mils thick. Samples of the resulting sheets containing the various higher alkyl ester additives were exposed to outdoor weathering on a rack facing south at an angle with the horizontal of 36.5° at Kingsport, Tennessee. Polyethylene samples containing none of the present higher alkyl ester additive and 1% by weight of 2,4-dihydroxybenzophenone were also included in the weathering test. After 10 weeks of exposure, the individual polyethylene samples containing the nine higher alkyl esters of 3-hydroxy-4-(phenylcarbonyl)phenoxyacetic acid were found to have no increase in carbonyl content as determined by infrared spectral measurements in the 5.82μ region. However, the sample containing none of the present alkyl ester additive had a substantial carbonyl increase. The surfaces of the exposed samples were also observed and no objectionable amount of exudation was noted on the samples containing the higher alkyl esters of 3-hydroxy-4-(phenylcarbonyl)phenoxyacetic acid. However, the exposed sample containing 2,4-dihydroxybenzophenone was observed to contain much exudation of this additive on the surface thereof. The methyl and the ethyl esters of 3-hydroxy-4-(phenylcarbonyl)phenoxyacetic acid, which were prepared in accordance with the method described in Example 1, were also found to be incompatible with polyethylene and exuded from polyethylene after being incorporated therein by milling. Thus, the present novel higher alkyl ester derivatives of 2,4-dihydroxy-benzophenone have unexpectedly good compatibility with polyethylene as compared to 2,4-dihydroxybenzophenone and the lower alkyl esters corresponding to the present stabilizers.

The photodegradation of such organic plastic materials as polyethylene is characterized by the breaking of the polymer chain and the formation of ketonic carbonyl groups. If the degradation or deterioration continues long enough, the mechanical and electrical properties of polyethylene deteriorates seriously. However, before this deterioration of physical properties can be detected by usual tensile strength, brittleness, or elongation measurements, evidence of photodegradation can be obtained by detection of the presence of the resulting carbonyl groups by infrared spectral analysis. Thus, the carbonyl content test, such as was used to determine the effectiveness of the present stabilizers in polyethylene as described in Example 2 above, gives in a short period of ten weeks, for example, information concerning photodegradation which would require one to two years to obtain by using more conventional methods. Reference is made to the following two publications concerning the determination of carbonyl content by infrared measurements: Rugg, Smith and Bacon, J. Polymer Sci., 13, 535(1954) and Cross, Richards and Willis, Discussions Faraday Soc., No. 9, 235(1950).

Thus, the present invention provides a new and useful group of compounds, namely, higher alkyl esters of 3-hydroxyl-4-(phenylcarbonyl)phenoxyacetic acid. These novel esters are effective as stabilizers for organic plastic materials normally subject to photodegradation, and particularly as stabilizers for polyethylene compositions.

Although the invention has been described in considerable detail with reference to certain preferred embodiments thereof, it will be understood that variations and modifications can be effected within the spirit and scope of the invention as described hereinabove and as defined by the appended claims.

I claim:
1. A solid poly-α-olefin composition comprising solid polyethylene and about 0.01% to 10% by weight based on said polyethylene of a compound having the formula

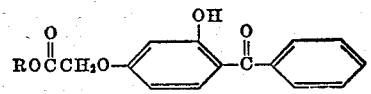

wherein R is an alkyl group containing 6 to 18 carbon atoms.

2. A solid poly-α-olefin composition comprising solid polyethylene and about 0.5% to 2.5% by weight based on said polyethylene of the n-hexyl ester of 3-hydroxy-4-(phenylcarbonyl)-phenoxyacetic acid.

3. A solid poly-α-olefin composition comprising solid polyethylene and about 0.5% to 2.5% by weight based on said polyethylene of the n-octyl ester of 3-hydroxy-4-(phenylcarbonyl)phenoxyacetic acid.

4. A solid poly-α-olefin composition comprising solid polyethylene and about 0.5% to 2.5% by weight based on said polyethylene of the 2-ethylhexyl ester of 3-hydroxy-4-(phenylcarbonyl)phenoxyacetic acid.

5. A solid poly-α-olefin composition comprising solid polyethylene and about 0.5% to 2.5% by weight based on said polyethylene of the n-decyl ester of 3-hydroxy-4-(phenylcarbonyl)phenoxyacetic acid.

6. A solid poly-α-olefin composition comprising solid polyethylene and about 0.5% to 2.5% by weight based on said polyethylene of the n-dodecyl ester of 3-hydroxy-4-(phenylcarbonyl)phenoxyacetic acid.

References Cited in the file of this patent

UNITED STATES PATENTS

| | | |
|---|---|---|
| 2,449,991 | Gresham et al. | Sept. 28, 1948 |
| 2,603,615 | Dazzi | June 15, 1952 |
| 2,831,768 | Merrill et al. | Apr. 22, 1958 |

FOREIGN PATENTS

| | | |
|---|---|---|
| 700,048 | Great Britain | Nov. 25, 1953 |